United States Patent [19]

Hansen

[11] Patent Number: 5,111,228

[45] Date of Patent: May 5, 1992

[54] HORIZONTAL/VERTICAL FRAME VIEWFINDER

[75] Inventor: David E. Hansen, Fairport, N.Y.

[73] Assignee: Eastman Kodak Company, Rochester, N.Y.

[21] Appl. No.: 670,635

[22] Filed: Mar. 18, 1991

[51] Int. Cl.$^5$ .............................................. G03B 13/10
[52] U.S. Cl. ................................................... 354/222
[58] Field of Search ................................. 354/222, 223

[56] References Cited

U.S. PATENT DOCUMENTS

| 1,181,458 | 5/1916 | Hyler | 354/222 |
| 2,719,468 | 10/1955 | Steiner | 354/222 |
| 3,011,385 | 12/1961 | Frost | 354/222 |
| 4,529,283 | 7/1985 | Oshima et al. | 354/222 |
| 4,557,578 | 12/1985 | Seely | 354/409 |
| 4,589,749 | 5/1986 | Strobel | 354/221 |

Primary Examiner—L. T. Hix
Assistant Examiner—David M. Gray
Attorney, Agent, or Firm—Roger A. Fields

[57] ABSTRACT

A viewfinder in a camera includes visual composition means manually operable to change from a horizontal frame view of a subject to be photographed to a vertical frame view of the subject without having to change the horizontal orientation of the camera to a vertical one. If a vertical format of the subject is selected for picture-taking, the camera is changed to a vertical orientation and the visual composition means is manually released to return automatically to the horizontal frame view of the subject. Since the camera has been changed to a vertical orientation, the horizontal frame view will appear as a vertical one.

4 Claims, 4 Drawing Sheets

HORIZONTAL/VERTICAL FRAME VIEWFINDER

BACKGROUND OF THE INVENTION

1. Field of the Invention

The invention relates generally to optical viewfinders for cameras, and in particular to a viewfinder for use in a camera to view a subject to be photographed with the camera oriented horizontally or vertically.

2. Description of the Prior Art

When taking a picture it is necessary to know not only in what direction to aim the camera but also how much of the subject or scene will be included in the picture. For this reason practically every modern camera has a viewfinder of some kind.

Most modern cameras include an optical viewfinder for viewing and framing the subject to be photographed. The viewfinder typically includes framing marks which define a rectangular-shaped view of the subject. When the camera is oriented horizontally for picture-taking, the rectangular-shaped view of the subject is horizontally oriented, i.e., it is longer in the horizontal direction than in the vertical direction. Conversely, to correctly view a subject for picture-taking with the camera vertically oriented, the camera must first be changed from its horizontal orientation to a vertical one in order to re-orient the rectangular-shaped view to a vertical orientation.

SUMMARY OF THE INVENTION

According to the invention, a viewfinder in a camera includes visual composition means manually operable to change from a horizontal frame view of a subject to be photographed to a vertical frame view of the subject without having to change the horizontal orientation of the camera to a vertical one. If a vertical format of the subject is selected for picture-taking, the camera is changed to a vertical orientation and the visual composition means is manually released to return automatically to the horizontal frame view of the subject. Since the camera has been changed to a vertical orientation, the horizontal frame view will appear as a vertical one.

Thus, in contrast to the prior art, the photographer can preview a vertical format of the subject with the camera in a horizontal orientation.

DETAILED DESCRIPTION OF THE PREFERRED EMBODIMENT OF THE INVENTION

The invention is disclosed as being embodied preferably in a conventional still-picture camera having a projected reticle viewfinder. Because the features of these cameras and viewfinders are well known, the description which follows is directed in particular to elements forming part of or cooperating directly with the preferred embodiment. It is to be understood, however, that other elements not shown or described may take various forms known to persons of ordinary skill in the art.

Figure 1:
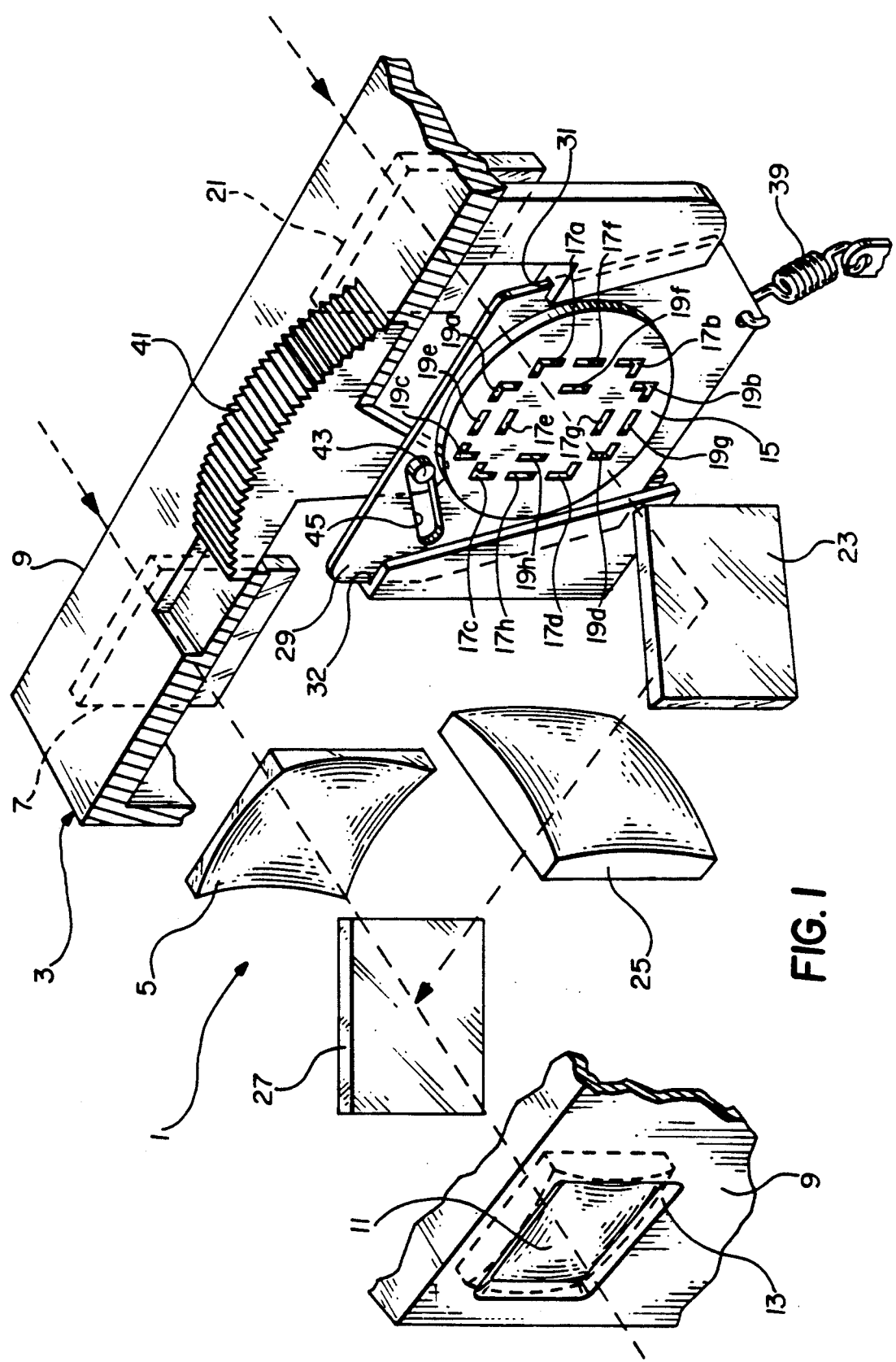
FIG. 1 is an exploded perspective view of an optical viewfinder for a camera according to a preferred embodiment of the invention, showing visual composition means of the viewfinder in a horizontal frame mode with the camera oriented horizontally.
Figure 4:
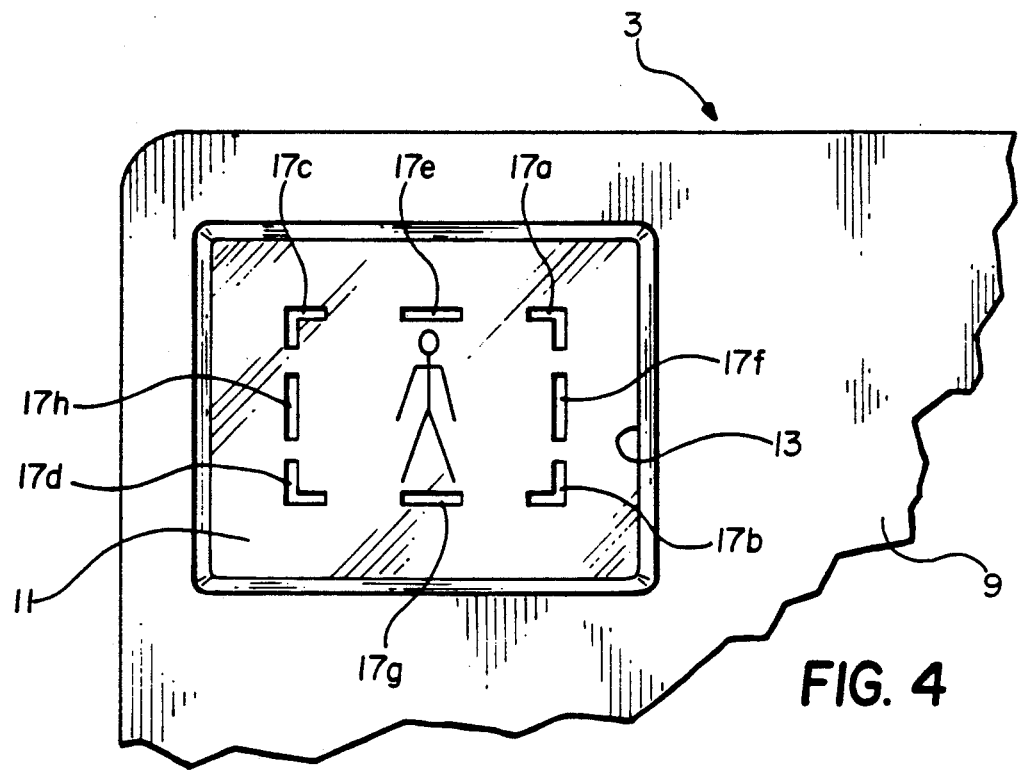
FIG. 4 is a rear elevation view of the camera oriented horizontally with the visual composition means in the horizontal frame mode as seen through a rear window of the viewfinder.
Figure 5:
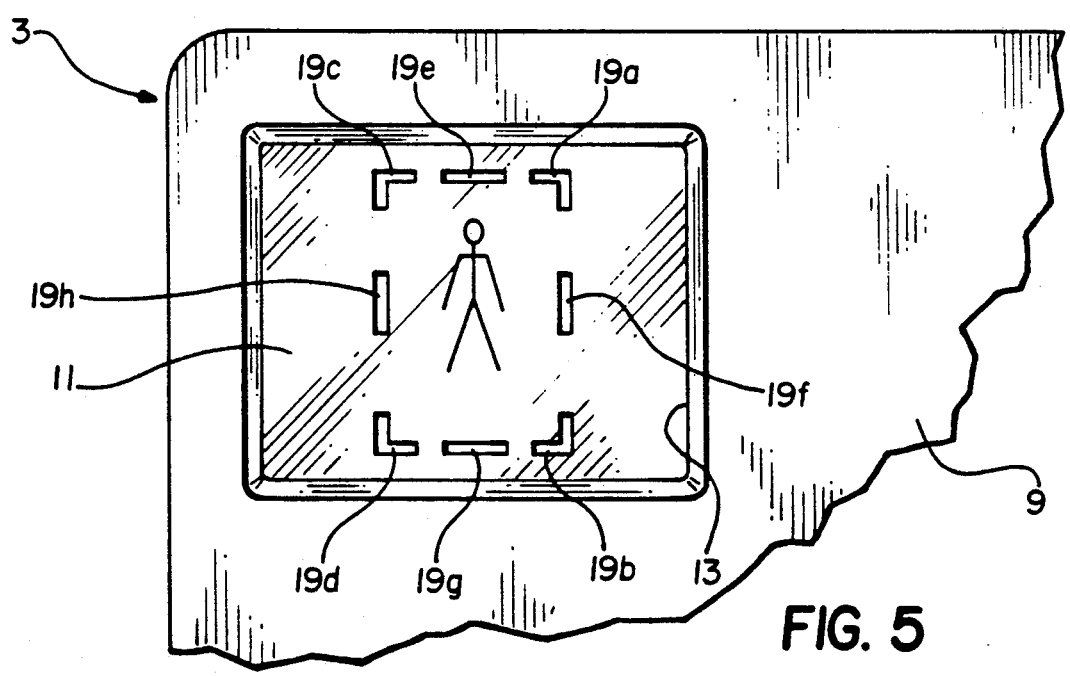
FIG. 5 is a rear elevation view of the camera oriented horizontally with the visual composition means in the vertical frame mode as seen through the rear window of the viewfinder.
Figure 6:
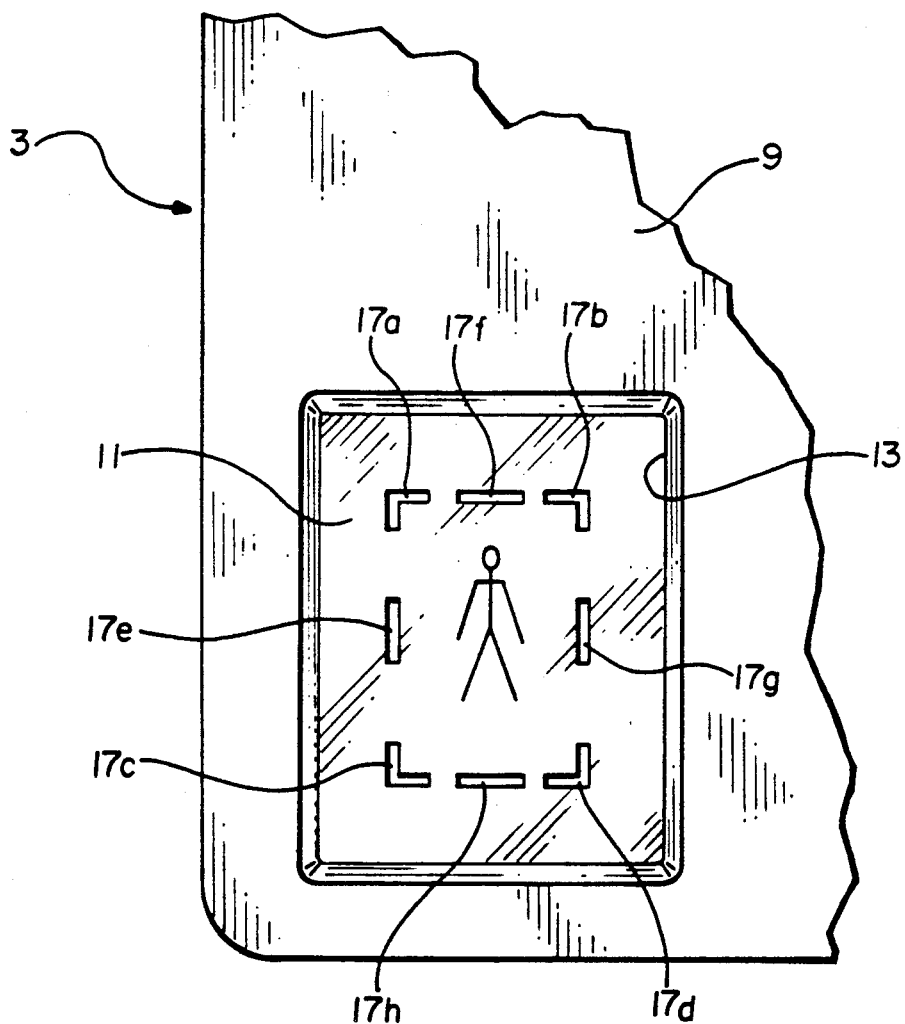
FIG. 6 is a rear elevation view of the camera oriented vertically with the visual composition means in the horizontal frame mode as seen through the rear window of the viewfinder.

Referring now to the drawings, and in particular to FIG. 1, a projected reticle viewfinder 1 for use in a conventional still-picture camera 3 is illustrated. As shown, a negative lens 5 is located between a glass-filled or plastic-filled viewing window 7 at the front of the camera body 9 and a positive (eyepiece) lens 11 in an open viewing window 13 at the rear of the camera body to enable a photographer to view an erect image of a subject to be photographed. A fixed opaque reticle plate 15 includes a first set of four corner framing marks 17a, 17b, 17c and 17d and four intermediate framing marks 17e, 17f, 17g, and 17h, and a second set of four corner framing marks 19a, 19b, 19c and 19d and four intermediate framing marks in 19e, 19f, 19g and 19h, preferably in the form of respective cut-outs in the reticle plate. The framing marks 17a-17h define a horizontal frame view of a subject to be photographed when the camera body 9 is oriented horizontally as shown in FIG. 4 and, alternatively, define a vertical frame view of the subject when the camera body is oriented vertically as shown in FIG. 6. The framing marks 19a-19h define a vertical frame view of a subject to be photographed when the camera body 9 is oriented horizontally as shown in FIG. 5. The reticle plate 15 is located between a glass-filled or plastic-filled illuminating window 21 at the front of the camera body 9 and a 45° inclined mirror 23. A positive lens 25 is located between the 45° inclined mirror 23 and a similarly inclined beam splitter 27. In turn, the beam splitter 27 is located between the negative lens 5 and the eyepiece lens 11. Thus, the photographer can view the framing marks 17a-17h or 19a-19h superimposed on an erect image of a subject to be photographed by looking through the eyepiece lens 11.

Figure 2:
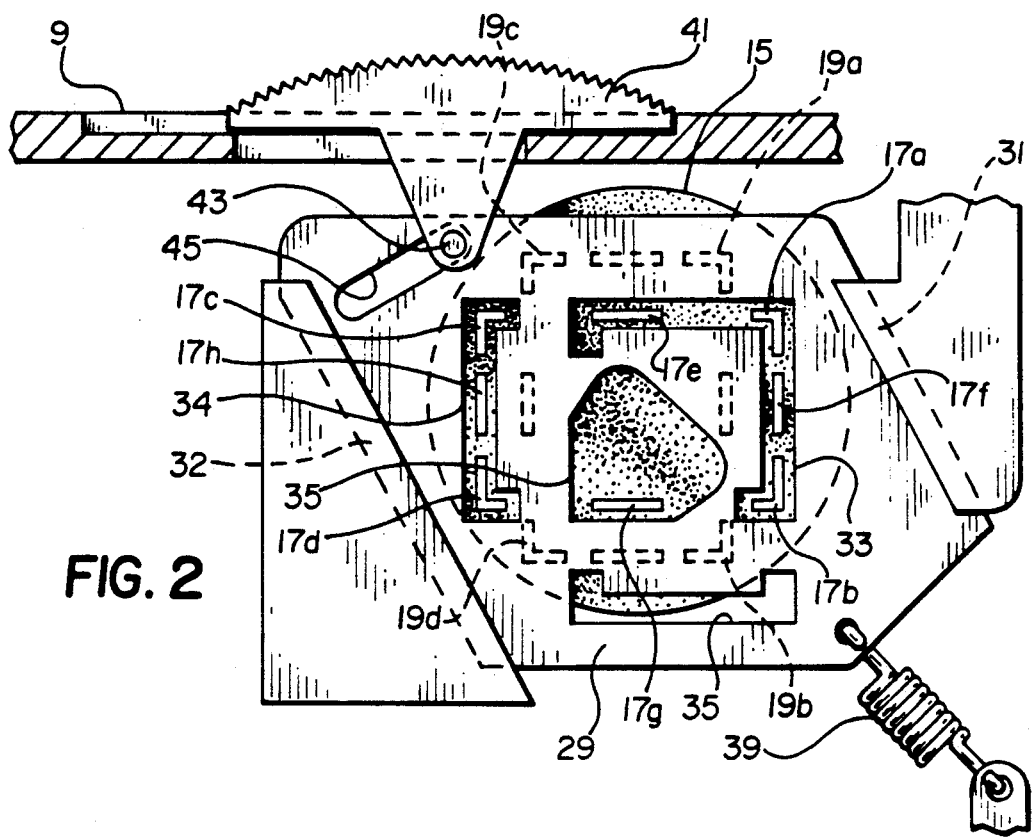
FIG. 2 is an elevation view of the visual composition means in the horizontal frame mode with the camera oriented horizontally.
Figure 3:
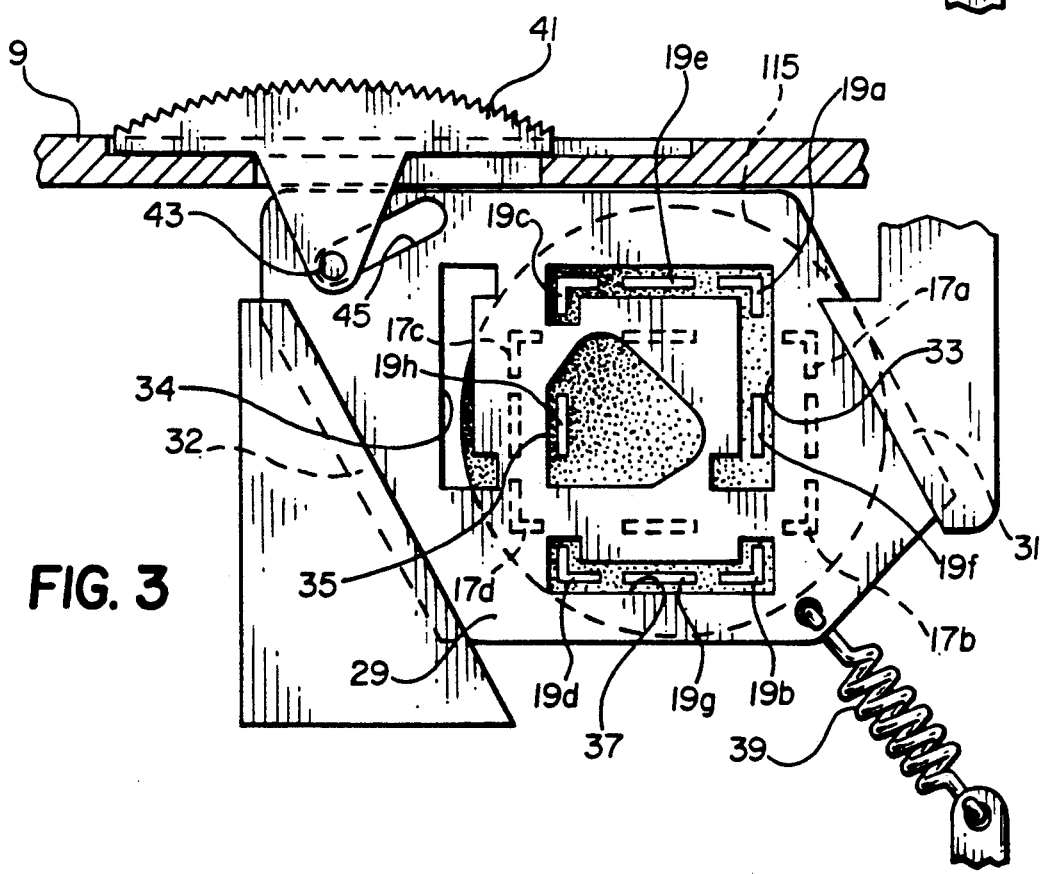
FIG. 3 is an elevation view of the visual composition means in a vertical frame mode with the camera oriented vertically.

A frame-concealing opaque mask 29 in contact with the one side of the reticle plate 15 facing the illuminating window 21 is supported via a pair of parallel channels 31 and 32 for movement between a horizontal mode position shown in FIGS. 1 and 2 and a vertical mode position shown in FIG. 3. In the horizontal mode position, the mask 29 conceals or covers the framing marks 19a-19h and reveals the framing marks 17a-17h through three openings 33, 34 and 35 in the mask. In the vertical mode position, the mask 29 conceals or covers the framing marks 17a-17h and reveals the framing marks 19a-19h through the two openings 33 and 35 in the mask and through a forth opening 37 in the mask. A helical compression spring 39 biases the mask 29 to its horizontal mode position. A knurled change-over knob 41 includes a cam pin 43 that extends into a follower slot 45 in the mask 29 to enable manual movement of the knob to the left in FIGS. 1 and 2 to shift the mask from its horizontal mode position shown in FIGS. 1 and 2 to its vertical mode position shown in FIG. 3. When the knob 41 is manually released, the spring 39 moves the knob to the right in FIG. 3 to return the mask 29 to its horizontal mode position.

OPERATION

When the camera body 9 is oriented horizontally and the mask 29 is in its horizontal mode position, the framing marks 17a-17h are superimposed on an erect image of a subject to be photographed as can be seen by looking through the eyepiece lens 11 in FIG. 4.

To view the framing marks 19a-19h without having to change the horizontal orientation of the camera body 9 to a vertical one as in FIG. 5, the mask 29 is changed to its vertical mode position by appropriately moving the knob 41

If a vertical format of the subject is desired for picture-taking, the camera body 9 is changed to a vertical orientation and the knob 41 is released to allow the spring 39 to return the mask 29 to its horizontal mode position. Since the camera body 9 has been changed to a horizontal orientation, the framing marks 17a-17h will appear to be vertical ones. See FIG. 6.

The invention has been described with reference to a preferred embodiment. However, it will be appreciated that various modifications can be effected within the ordinary skill in the art without departing from the scope of the invention. For example, instead of using the projected reticle viewfinder 1 another type optical viewfinder may be employed.

I claim:

1. A viewfinder for use in a camera to view a subject to be photographed with the camera oriented horizontally or vertically, is characterized in that:

visual composition means is manually operable for changing from a horizontal frame view of a subject to be photographed to a vertical frame view of the subject without having to change the camera from a horizontal orientation to a vertical one;

said visual composition means includes reticle means having a first set of framing marks visible for defining said horizontal frame view of subject to be photographed and a second pair of framing marks visible for defining said vertical frame view of the subject, and masking means manually adjustable for alternatively concealing said first and second sets of framing marks.

2. A viewfinder as recited in claim 1, wherein said visual composition means includes integral means for biasing the visual composition means from said vertical frame view of a subject to be photographed to said horizontal frame view of the subject to permit the horizontal frame view to appear as a vertical frame view when the camera is changed from a horizontal orientation to a vertical one.

3. A viewfinder as recited in claim 1, wherein said visual composition means includes integral means for biasing said masking means normally to conceal said second set of framing marks and to reveal said first set of framing marks.

4. A viewfinder as recited in claim 1 or 3, wherein said visual composition means includes a manually accessible change-over knob connected to said masking means to permit manual adjustment of the masking means to alternatively conceal said first and second sets of framing marks.

* * * * *